UNITED STATES PATENT OFFICE.

WILLIAM G. LINDSAY, OF NEW YORK, N. Y., ASSIGNOR TO THE CELLULOID COMPANY, OF NEW YORK, N. Y., A CORPORATION OF NEW JERSEY.

SOLVENTS FOR ACETYL CELLULOSE.

1,027,486.     Specification of Letters Patent.     Patented May 28, 1912.

No Drawing.     Application filed August 10, 1911. Serial No. 643,375.

*To all whom it may concern:*

Be it known that I, WILLIAM G. LINDSAY, a citizen of the United States, residing in the city of New York, county of New York, State of New York, have invented certain new and useful Improvements in Solvents for Acetyl Cellulose, of which the following is a specification.

The various compositions to which the present invention relates are employed in the arts mainly as imitations of natural substances and consist of soluble cellulose combined with or dissolved in certain other substances or menstrua.

Although the final or useful form of the different compounds of this class is that of a solid or dried material, different processes of conversion into this final solid form involve, as is well understood, the employment of solutions or mixtures of varying consistency as to plasticity, stiffness or fluidity, dependent generally upon the proportion and kind of solvent used to the amount of cellulose.

There are two classes of solvents;—liquid solvents, of which wood spirit is a good example for nitro cellulose, and solid solvents, of which camphor is a good representative for nitro cellulose. Solvent mixtures are also formed by combining two or more substances with each other; the components of the mixed solvent in such a case may not necessarily be possessed of individual solvent power. For instance, alcohol, which is practically a non-solvent in itself, forms a good solvent mixture for nitro cellulose when camphor is dissolved in it; ethyl alcohol and ether form a solvent of nitro cellulose, while neither is a solvent by itself. Methyl alcohol will dissolve nitro cellulose, but is not a solvent by itself of acetyl cellulose. The various applications of this art require the employment of complex mixtures in the solvent,—single substances being rarely used for such purposes. Hence, while the advancement of the art has, as is well known, depended largely on the discovery and application of new single solvent substances, yet it has required also the invention of combinations of solvents by which effects are produced quite different from those produced when single solvents are employed alone.

I have discovered that the solvent power of acetodichlorhydrin for acetyl cellulose is greatly increased by the use of an alcohol such as ethyl or methyl alcohol and that objects such as films, sheets, &c., produced by the evaporation of a solution of acetyl cellulose in this compound solvent possess great toughness and flexibility. It is within my invention to utilize this compound solvent in connection with other solvents or diluents, such as acetone, which may be used to modify the volatility of the solution; and in solid compounds this compound solvent may be used in conjunction with such solids as camphor, &c., and with coloring matters and with inert material which give body to the composition, as is well known to those skilled in the art.

As an example of carrying out my invention I proceed as follows: I dissolve one part of acetyl cellulose (by weight) in a mixture consisting of three parts of acetodichlorhydrin (by volume) and two parts methyl alcohol (by volume). Such a mixture is suitable for the manufacture of films or sheets by evaporation, and if a massive product is desired the evaporation may be promoted by kneading the mass on rolls, as is well understood in the art. Again, a mixture of acetodichlorhydrin and ethyl alcohol in equal parts is efficient. But I do not limit myself to the specific proportions given in the above examples.

What I claim and desire to secure by Letters Patent is:

1. A composition of matter consisting of acetyl cellulose dissolved in a mixture of acetodichlorhydrin and alcohol, substantially as described.

2. A composition of matter consisting of acetyl cellulose dissolved in a mixture of acetodichlorhydrin and alcohol in admixture with other solvents, substantially as described.

3. A composition of matter consisting of acetyl cellulose dissolved in a mixture of acetodichlorhydrin and alcohol in admixture with other solvents and coloring matters and inert substances, substantially as described.

WILLIAM G. LINDSAY.

Witnesses:
J. E. HINDON HYDE,
MABEL DENTON.